United States Patent
Tiek et al.

(10) Patent No.: US 8,770,009 B2
(45) Date of Patent: Jul. 8, 2014

(54) COMPENSATION ARRANGEMENT AND METHOD FOR OPERATION THEREOF

(75) Inventors: Tim Tiek, Enschede (NL); Paulus Thomas Gennissen, Markelo (NL)

(73) Assignee: Sensata Technologies, Inc., Attleboro, MA (US)

( * ) Notice: Subject to any disclaimer, the term of this patent is extended or adjusted under 35 U.S.C. 154(b) by 814 days.

(21) Appl. No.: 13/027,295

(22) Filed: Feb. 15, 2011

(65) Prior Publication Data

US 2011/0137599 A1    Jun. 9, 2011

Related U.S. Application Data

(62) Division of application No. 11/916,560, filed as application No. PCT/NL2005/000560 on Jul. 29, 2005, now Pat. No. 7,913,536.

(51) Int. Cl.

| | |
|---|---|
| *G01D 3/028* | (2006.01) |
| *G01D 3/032* | (2006.01) |
| *G01L 27/00* | (2006.01) |
| *G01L 19/02* | (2006.01) |
| *G01L 19/04* | (2006.01) |
| *G01L 23/22* | (2006.01) |

(52) U.S. Cl.
CPC ............. *G01D 3/028* (2013.01); *G01D 3/032* (2013.01); *G01L 19/02* (2013.01); *G01L 19/04* (2013.01); *G01L 23/22* (2013.01); *G01L 27/005* (2013.01)
USPC ............ 73/1.59; 73/1.01; 73/1.88; 73/114.18

(58) Field of Classification Search
CPC ........ G01D 3/028; G01D 3/032; G01L 19/02; G01L 19/04; G01L 23/22; G01L 27/005
USPC ......... 73/1.01, 1.59–1.62, 1.71, 1.88, 114.16, 73/114.18, 708
See application file for complete search history.

(56) References Cited

U.S. PATENT DOCUMENTS

| | | | | |
|---|---|---|---|---|
| 4,744,244 | A  * | 5/1988 | Tanaka ....................... | 73/114.16 |
| 6,060,922 | A  * | 5/2000 | Chow et al. .................... | 327/175 |
| 6,198,317 | B1 * | 3/2001 | Chow et al. .................... | 327/116 |
| 6,278,309 | B1 * | 8/2001 | Saeki ............................ | 327/261 |
| 6,888,902 | B1 * | 5/2005 | Kondo .......................... | 375/344 |
| 7,180,346 | B2 * | 2/2007 | Lee .............................. | 327/175 |
| 7,667,504 | B2 * | 2/2010 | Braun et al. .................. | 327/113 |
| 7,940,103 | B2 * | 5/2011 | Satoh et al. ................... | 327/175 |
| 8,466,726 | B2 * | 6/2013 | Satoh et al. ................... | 327/175 |

* cited by examiner

Primary Examiner — Thomas P Noland
(74) Attorney, Agent, or Firm — Chapin IP Law, LLC

(57) ABSTRACT

An arrangement and method for providing compensation to a cyclical input signal is disclosed. The arrangement comprises a first detection unit (20) for detecting a first event in a cyclical output signal; a compensation signal generation unit (14) for generating a compensation signal; and a signal combination unit (8) for combining the compensation signal and the cyclical input signal to obtain the cyclical output signal. The compensation signal generation unit (14) is arranged to adjust the compensation signal at an instant which has a determined relationship with the detection of the first event. By adjusting the compensation signal at the right instant in a cycle of the cyclical output signal, the adjustment will not influence the further processing of the cyclical output signal. The method can be used to compensate the offset and sensitivity characteristics of a sensor.

8 Claims, 3 Drawing Sheets

COMPENSATION ARRANGEMENT AND METHOD FOR OPERATION THEREOF

RELATED APPLICATIONS

This application is a divisional of application Ser. No. 11/916,560, filed Dec. 5, 2007, still pending, which claims benefit under 35 U.S.C. Section 120 of International Application No. PCT/NL2005/00560, filed Jul. 29, 2005.

FIELD OF THE INVENTION

The present invention relates to a method of compensation for a cyclical input signal. In a further aspect, the invention relates to an arrangement for compensation of a cyclical input signal. The invention has particular application in engine control to compensate behavior changes of a sensor, such as offset and sensitivity, during operation of said sensor, due to for example ambient temperature changes.

PRIOR ART

Pressure sensors are commonly known. A pressure sensor has an offset voltage, which is the output voltage of a sensor when no pressure is applied. Furthermore, a pressure sensor has an offset voltage temperature characteristic. This characteristics defines the variation of the offset voltage with changes in ambient temperature of the sensor.

The Homogeneous Charge Compression Ignition Engine, HCCI, has the potential to combine the best of the spark ignition and compression ignition engines. These engines need active combustion control. The most accurate and reliable signal or indicator for the combustion is the in-cylinder pressure. With the standard heat release equation it is very easy to extract the combustion onset etc. from the cyclical pressure signal. A usable parameter for combustion phasing control is the crank angle at 50% of the heat release. The HR50 point is the crank angle corresponding to the moment having 50% of the heat release. The HR5 point is the crank angle corresponding to the moment having 5% of the heat release.

US2005/0061063 discloses a pressure glow plug for a diesel engine. The pressure glow plug is arranged such that the heating rod in the glow plug can be displaced in an axially sliding fashion, and that the heating rod transmits the pressure in the combustion chamber of the cylinder to the pressure sensor.

SUMMARY OF THE INVENTION

The present invention seeks to provide an improved compensation method for cyclical input signals, in particular cylinder pressure signals.

According to the present invention, the method of compensation for a cyclical input signal comprises
detecting a first event in a cyclical output signal;
generating a compensation signal;
combining the compensation signal and the cyclical input signal so as to obtain the cyclical output signal wherein the compensation signal is adjusted at an instant which has a determined relationship with the detection of the first event.

The invention is based on the following recognition. The known pressure glow plug working principle is based upon a moving glow rod which transfers a force induced by the cylinder pressure. This movement is translated into an electrical output in the sensing element of the sensor. The moving glow rod is welded to the sensing element on the top side, and welded to a metal membrane on the lower side. The glow rod and the sensor body have different temperature coefficients. Furthermore, the temperature will not be uniform throughout the sensor. Factors like these will cause an offset change in the signal retrieved from the sensing element when the temperature of the pressure glow plug changes. It has been found that the moment to change the offset value is critical with respect to the further processing of the offset compensated signal, even with a step size of 0.125% of full scale. For example, if the offset is adjusted between 255° and 295° crank angle an error up to 3°-5° crank angle can occur in the determination of the HR5 and HR50 point, if the offset is adjusted between 295° and 480° crank angle an error about 0.5° crank angle can occur in the determination of the HR5 and HR50 point and if the offset is adapted between 480° and 255° crank angle an negligible error in crank angle will occur in the determination of the HR5 and HR50 point. From the pressure sensor signal the crank angle can be determined. It has been found that the moment that the pressure falls below a determined value could be used to define a relationship with the instant to perform the adjustment of the compensation signal, such that the offset is adapted between 480° and 255° crank angle. An advantage of the method is that only signals from the moving glow plug are needed to perform the compensation and no signals from other processing units, such as a signal representative of the crank angle obtained by a crank angle sensor. This enables to integrate the compensation circuit into the pressure glow plug with only four connections to the outside world, namely a connection to ground, a connection to a power supply for the compensation arrangement, a connection for supplying the cyclical output signal and a power supply connection for the glow rod. By integrating the compensation arrangement in the pressure glow plug, a glow plug is provided which is temperature compensated and which is compensated for an offset which could be introduced by mounting the pressure glow plug in the engine.

In a further embodiment of the invention the compensation signal is adjusted a delay time period after the detection of the first event. Using this delay time period to perform the adjustment allows reducing the error in the determination of HR50 and HR5. The relationship between the detection of the first event and the crank angle should be reliable. It has been found that the instant of a reliable detection of the first event is not the best moment to perform the adjustment of the compensation signal. The relation between the pressure curve and crank angle is reliable during a pressure peak, thus when the cylinder is under pressure. The best moment to perform the adjustment is somewhere between two subsequent pressure peaks, thus when there is almost no pressure in the cylinder.

In a further embodiment of the invention the method comprises the step of determining a period of time between subsequent detections of events, wherein the delay time period has a relationship with said period of time. Using the step of determining a period of time between subsequent detections of events allows making a relationship between the rotation speed of the engine and the delay time period. This makes the method robust and independent of the range of rotation speed. In practice this feature enables to perform the adjustment a predefined number of crank angle degrees after the detection of the first event, which corresponds to the detection of a pressure peak.

In a further embodiment of the invention the compensation signal is generated in response to the detection of the first event and the detection of a second event in the cyclical output signal in the period after the detection of the first event and the subsequent detection of the first event. Using said feature allows reducing the complexity of the calculations to be performed to determine the value of the compensation signal. An example of the detection of a second event is the detection whether the cyclical output signal falls below a predefined value in a cycle. If the signal falls below said predefined value, the value of the compensation signal has to be decreased with a step value and if not, the value has to be increased with said step value. In this example is assumed that the value of the compensation signal is subtracted from the cyclical input signal.

In a further embodiment of the invention the compensation signal is generated in response to the detection of the first event and the detection of a second event and a third event in the cyclical output signal in the period after the detection of the first event and the subsequent detection of the first event. Using the detection of a second and third event allows having the possibility that the value of the compensation signal is not changed every cycle. For example, the second event is detected when the cyclical output signal falls below a value A and the third event is detected when the cyclical output signal falls below a value B, where A<B. If the second event is detected, the value of the compensation signal has to be decreased. In this case, in a cycle, the minimum value of the output signal in a cycle falls below a desired minimum value A. If neither the second event nor the third event is detected, the value of the compensation signal has to be increased. In this case, in a cycle, the minimum value of the output signal is too high and will be reduced by increasing the value of the compensation signal. In all other cases the compensation signal will not change.

In a further embodiment of the invention the compensation signal is generated in response to the detection of the first event and a further input signal. Using the combination of the detection of the first event and the further input signal allows to make the instant of adjustment dependent of the output signal and a compensation signal which is dependent of the further signal from a sensor. For example a pressure sensor can be made with four resistors and are arranged such that the output signal from the pressure sensor is temperature independent. However, the resistors are temperature dependent. This temperature dependency can easily be measured and used for offset, sensitivity and non-linearity compensation.

In a further embodiment of the invention the first event is determined by the falling edge of the cyclical output signal through a predefined output value. Usage of the falling edge has the advantage that the corresponding crank angle is roughly known. A value corresponding to 16% full scale is regarded to be suitable.

In a further embodiment of the invention the second event is detected when the cyclical output signal is below a further predefined output value. Usage of the further predefined output value enables to determine whether the current value of the compensation signal is too low or too high. It has been found that the method is very suitable for a signal from a cylinder pressure sensor. In a further embodiment of the invention the compensation signal is controlled with a digital signal. Usage of digital signals in stead of analog signals allows having very predictable and repeatable results and could save costs.

The present invention further seeks to provide an arrangement for providing an improved compensation on cyclical input signals, such as sensor signal coming from a cylinder pressure sensor and an output signal to be supplied to a motor management system or engine control unit.

The arrangement according to the invention comprises:
a first detection unit for detecting a first event in a cyclical output signal;
a compensation signal generation unit for generating a compensation signal;
a signal combination unit for combining the compensation signal and the cyclical input signal to obtain the cyclical output signal wherein the compensation signal generation unit is arranged to adjust the compensation signal at an instant which has a determined relationship with the detection of the first event.

Usage of the arrangement allows performing an adjustment of the compensation signal at an instant which has negligible effect on the further processing of the output signal.

SHORT DESCRIPTION OF DRAWINGS

The present invention will be discussed in more detail below, using a number of exemplary embodiments, with reference to the attached drawings, in which FIG. 1 shows a simplified block diagram of a first embodiment of an arrangement for compensation according to the present invention.

DETAILED DESCRIPTION OF EXEMPLARY EMBODIMENTS

Figure 1:
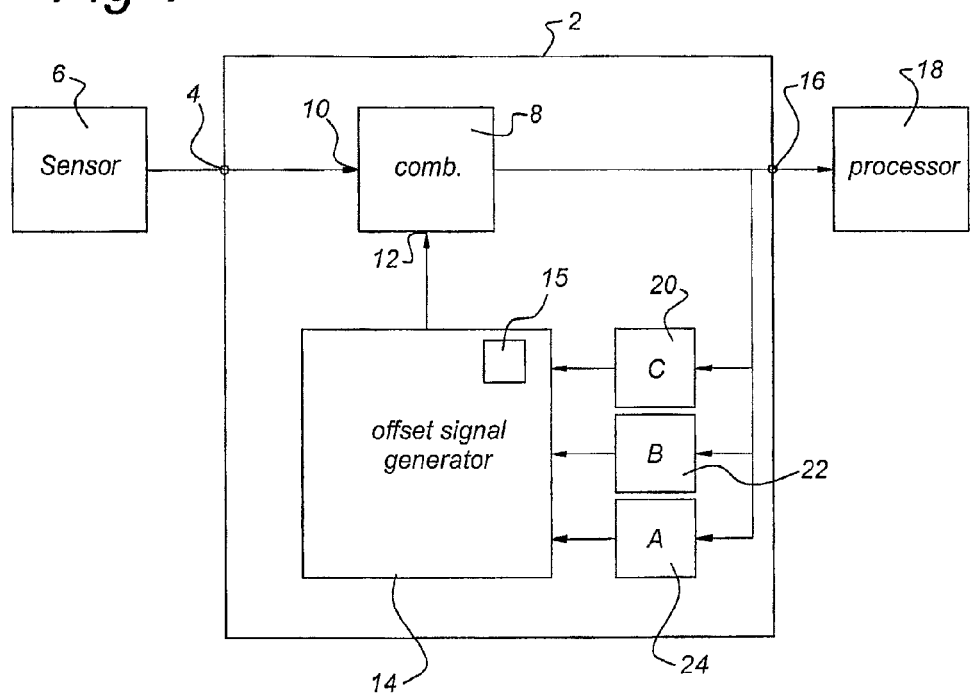

FIG. 1 shows a simplified block diagram of a first embodiment of an arrangement 2 for compensation according to the present invention. This embodiment will be discussed for compensating the offset in a cyclical input signal. The arrangement 2 comprises an input 4 for receiving the cyclical input signal. The cyclical input signal could be obtained from a pressure sensor 6, for example for measuring the pressure in a cylinder of an engine. The arrangement further comprises a signal combination unit 8 having a first input 10 coupled to the input 4 off the arrangement and a second input 12 coupled to an output of an offset signal generator unit 14. The signal combination unit 8 is arranged for combining the offset signal and the cyclical input signal to obtain the cyclical output signal. The signal combination unit 8 is normally arranged to subtract the offset signal from the cyclical input signal. However, if the offset signal generator 14 generates an inverted offset signal, the signal combination unit 8 is arranged to add both input signals. The cyclical output signal is supplied to an output 16 of the arrangement 2. The cyclical output signal can further be processed by an external processor 18, such as an engine control unit. The external processor 18 could be arranged to derive the heat release from the cyclical output signal and subsequently the corresponding crank angle point for the HR50 and HR5 point. The cyclical output signal is further supplied to a first detection unit 20 for detecting a first event in the cyclical output signal. Preferably, the first event is a characteristic of the cyclical input signal, which has a more or less predictable relationship with the crank angle of the engine. It has been found that for engine control a level of the pressure at typically 16% full-scale, is very suitable for peak detection. The first event is detected when the pressure curve falls through said 16% full scale value C. This is a very low cost and simple detection method. It should be noted that more complex detection algorithms might be used to detect a peak in the cyclical output signal.

The arrangement 2, furthermore, comprises a second detection unit 22 and a third detection unit 24. Preferably, the second detection unit 22 is arranged to detect that during a pressure cycle the pressure falls below a level B. In an advantageous embodiment the level B corresponds to a level at typically 12% of full scale. Preferably, the third detection unit 24 is arranged to detect that during a pressure cycle the pressure falls below a level A. In an exemplary embodiment the level A corresponds to a level at typically 11% of full scale. It should be noted that the detection by the second and third detection unit is limited to the detection within one cycle, but can be extended over more than one cycle.

The first, second and third detection unit 20, 22, 24 provide the respective first, second and third detection signal to the offset signal generator unit 14. The offset signal generation unit is arranged to adjust the offset signal at an instant which has a determined relationship with the detection of the first event. It has been found that an adjustment of the offset performed between two pressure peaks results in small or no errors when determining the HR50 and HR5 crank angle from the heat release curve.

Sometimes, the external processor 18 is arranged to process pressure signals from two cylinders. Alternating, the external processor 18 is connected to one of the two pressure signals. This enables the determination of the heat release curve from each of the peaks in the corresponding pressure signal. In this case, the adjustment of the offset signal has to be performed when the external processor 18 is processing the other pressure signal. It has been found that a fixed delay between the instant of detection and the adjustment is a very simple and inexpensive solution that is suitable. A delay of 20 ms is suitable for engines which have a normal operation in the range of 850-4000 rpm.

However, if a wider range has to be supported, the offset signal generator could comprise a period determining unit 15 for determining a period of time between subsequent detections of the first event, and wherein the delay time period has a relationship with said period of time. This enables to make a delay in terms of crank angle instead of seconds by determining first the rotating speed of the engine and subsequently dividing a constant by the rotation speed. In this way, the adjustment is performed a fixed rotation of the crank angle after detection of the first event.

The rotating speed of the engine could also be determined by the period of time between two specific events in a cycle of the cyclical output signal, for example the moment the pressure curve passes the level of 20% full scale at the rising and falling slope. This could be done as there is a clear relationship between the pressure curve en the crank angle. In this embodiment the arrangement 2 should comprises a unit (not shown) which detects the instants of the two specific events. The period determining unit 15 should be arranged to determine the delay time period from the instants of said two subsequent detections of events. Due to the non-linear behavior of the engine the relationship between the rotating speed and the delay time period could be non-linear.

The value of the offset signal could be generated by a simple up/down counter. The counter value could be supplied to a DA-converter if the signal combination unit 8 is arranged to combine analogue signals. It might be clear that preferably the word-length of the DA-converter corresponds to the word-length of the counter. In this case, a step down corresponds to −1 LSB of the DA converter, and 1 step up corresponds to +1 LSB of the DA converter. It has been found that a DA converter with a word length of 11 bits is suitable for the application in combination with a pressure sensor.

The offset signal generator 14 is arranged such that if during the period between two subsequent instants of adjustment the pressure signal did not go below level A and was not always above level B, the offset signal will be unchanged. If during the period between two subsequent instants of adjustment the pressure signal goes below level A, the offset signal will be decreased with a step and adjusted after the detection of the pressure peak. And, if during the period between two subsequent instants of adjustment the pressure signal never goes below level B, the offset signal will be increased with a step and adjusted after the detection of the pressure peak. This means that if the minimum value of the pressure signal is above B, the offset has to be increased to lower the cyclical output signal and that if the minimum value of the pressure signal is below A, the offset has to be decreased to increase the cyclical output signal. By doing so, the minimum of the pressure signal will be kept between level A and level B, because somewhere between level A and level B, a level corresponding to 0 bar will exist.

It should be noted that in a specific embodiment the arrangement does not comprise the third detection unit 24. In this embodiment, without the third detection unit 24, the cyclical offset signal will be adjusted after each detection of the first event, thus each cycle.

The embodiment described above is a very simple and inexpensive implementation of the invention. In stead of level detection by the second and third detection unit 22, 24, a detection unit could be arranged to determine the minimum value of the cyclical output signal in the last cycle. The offset signal generator unit 14 could then be arranged to determine the new offset value by adding to the current offset value the difference between the minimum value of the current cycle and the minimum value of the previous cycle.

Figure 2:
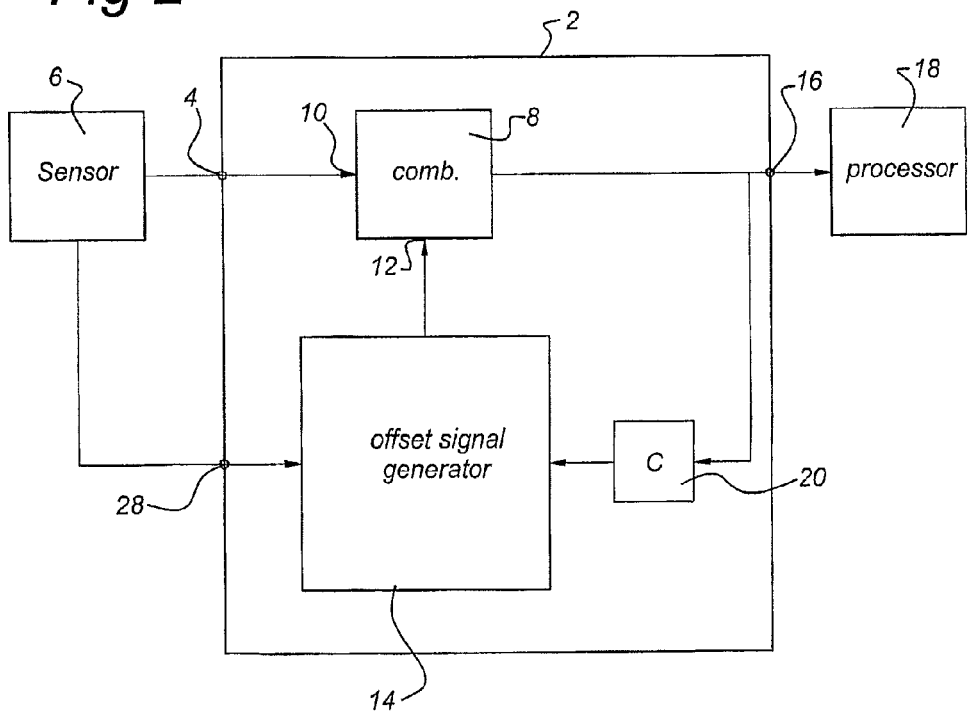
FIG. 2 shows a simplified block diagram of a second embodiment of an arrangement for compensation according to the present invention.

FIG. 2 shows a simplified block diagram of a second embodiment of an arrangement 2 for compensation according to the present invention. Instead of determining the offset value using the detections signals from the second and third detection unit, the offset value is determined using a further signal from the sensor and supplied to an input 28 of the arrangement. It is commonly known that the Wheatstone bridge resistance of a pressure sensor is temperature dependent. This temperature dependency is also suitable for compensating the offset in case of a uniform temperature. Furthermore, for a pressure glow plug the relation between temperature and offset value for steady state and variations in time can be determined. This relation can be used to determine the offset value using the further input signal retrieved from the sensor. Therefore, the offset generator unit 14 is coupled to the sensor to retrieve a signal having a relationship with temperature. Similarly, to the first embodiment disclosed in FIG. 1, the offset signal is adjusted at an instant which has a determined relationship with the detection of the first event, for example 20 ms after the detection of the first event.

Furthermore, it should be noticed that the gain of the sensor element 8 is also temperature dependent. The gain or sensitivity compensation could be derived from the further signal retrieved from the sensor 6. In that case the offset generator unit 14 is more generally a compensation signal generator unit. The unit 14 is then further arranged to determine a new gain value from the further signal and to adjust the gain signal supplied to the signal combination unit 8 to the new gain value at an instant which has the determined relationship with the detection of the first event. The signal combination unit 8 is then arranged to receive at the input 12 the offset signal and a gain signal and to apply both offset and sensitivity compensation. The offset signal and the gain signal will be adjusted at substantially the same instant.

Figure 3:
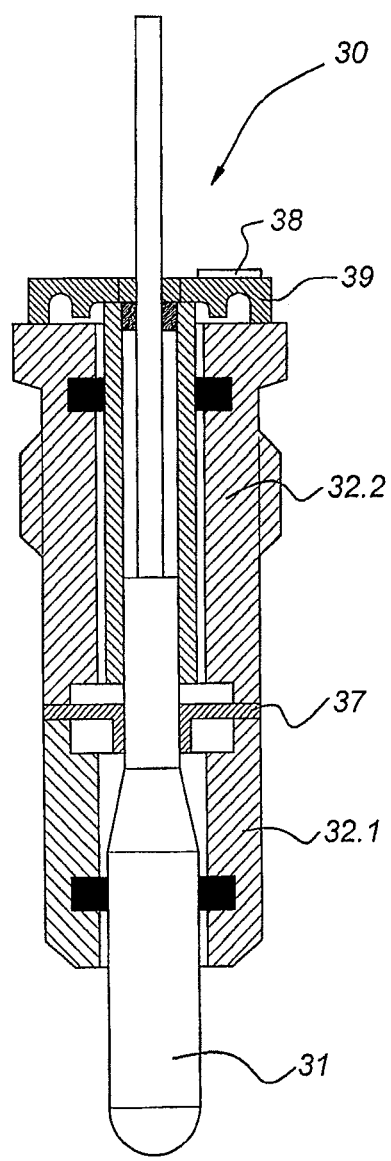
FIG. 3 is a sectional view of a pressure glow plug.

In FIG. 3 a sectional view of a pressure glow plug 3 for use in combination with the arrangement for compensation is illustrated. The pressure glow plug 30 comprises a heating rod 31 arranged in a glow plug body, wherein the glow plug body is composed of two parts, namely the upper part 32.2 on the connection and a lower part 32.1 on the combustion chamber side. A membrane 37 is fixed to the heating rod 31. The membrane 37 is realized in such a way that it seals the arrangement in a gas-tight fashion in the direction of the connection end of the glow plug 30. A sensor element 38 that is realized, for example, in the form of a strain gauge, is arranged radially on a flexible carrier element 39. The heating rod 31 is welded to the flexible carrier element 39 on one side, and welded to the membrane 37 on the other side. The pressure in the cylinder of the engine is exerted upon the heating rod 31 such that the heating rod 31 is axially displaced and causes deformation of the flexible carrier element 39. The deformation results in tensile stress of elongation of the sensor element 38, which causes a signal change that can be detected and evaluated. Because the heating rod 31 and the glow plug body 32.2 have different temperature coefficients and as the temperature will not be uniform throughout the pressure glow plug 30, temperature deltas will result in an offset change as measured by the sensor element 38. Furthermore, it should be noticed that there is also an offset change possible during mounting of the pressure glow plug 30 in the engine. All these effects could result in an offset shift on the sensor output. When the sensor element provides the cyclical input signal, the arrangement according to the invention can be seen as a high-pass filter, blocking DC changes and allowing AC-signals (the pressure curves) to pass. The arrangement keeps the resolution of the output high by reducing the offset shift to approximately 1% without influencing the gain.

Figure 4:
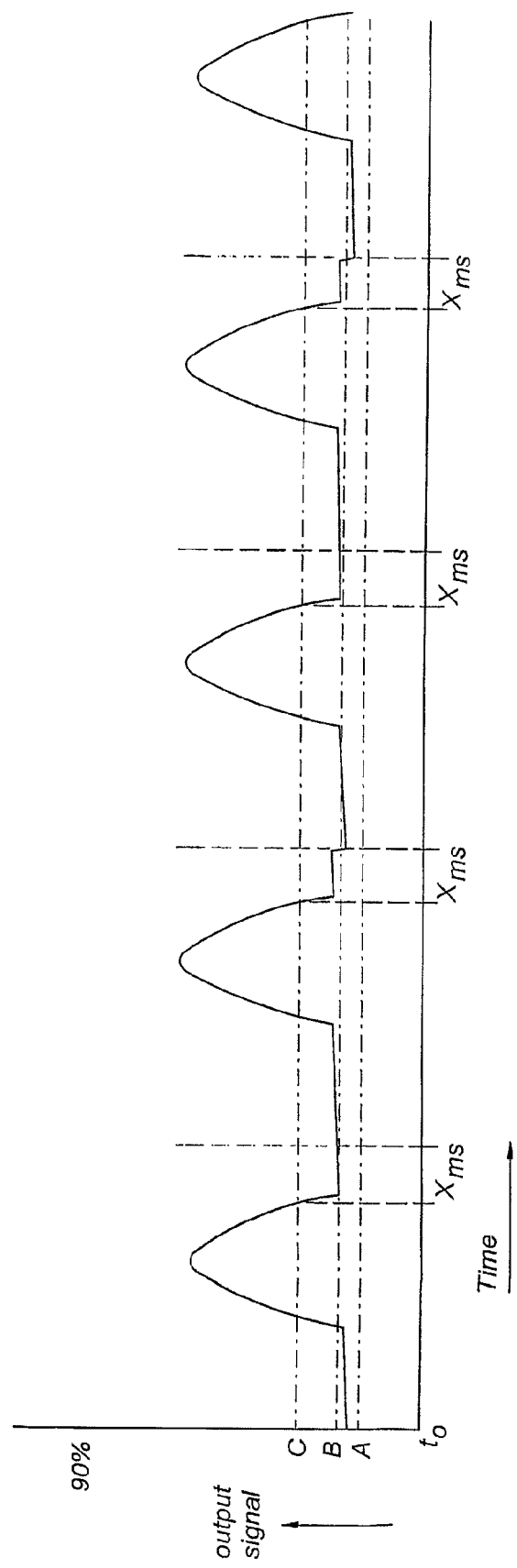
FIG. 4 shows a time diagram illustrating the functioning of the method in accordance with the present invention.

FIG. 4 shows a time diagram illustrating the functioning of an embodiment of the method in accordance with the present invention. The diagram shows five cylinder pressure cycles. The pressure curves are not on scale and only indicative. The vertical axis represents the pressure value as percentage of the maximum value of the output signal. The horizontal line indicated with C shows the level that is used for detecting the first event. A level at typically 16% of full scale has been found to be suitable. In this example the detection is based on peak detection. A falling edge passing a predefined level triggers the detection of the first event. This corresponds within limits to the instant that a predefined part of the peak has been passed. The horizontal lines indicated with B and A show the levels that are used for detecting the second and third event respectively. A level at typically 12% of full scale has been found suitable for level B and a level at typically 11% has been found suitable for level A. In practice somewhere between level A and B is the level that corresponds to a pressure of 0 bar.

Furthermore, FIG. 4 shows that in the first pressure cycle the pressure falls below level B and stays above level A. According to this condition at the moment of the detection of the first event is defined the offset does not need to be adjusted. Therefore, X ms after the detection of the first event no change in the output signal is seen. It has been found that the combination of the detection of the instant where the pressure curve has a falling edge through the 16% level and 20 ms delay is very suitable. For the person skilled in the art, it is obvious that when the detection of the first event was done on a rising edge through the 16% level, the value X should be adapted accordingly. In the second pressure cycle, the pressure does not fall below both level B and level A. At the moment of the detection of the first event this condition defines that the offset has to be adjusted. The offset value has to be increased. As the offset value is subtracted from the signal from the sensor, the output signal will decrease. Therefore, X ms after the detection of the first event a drop in the output signal is seen. The step is a discrete step and corresponds to an increase of the offset signal with one LSB. In the third pressure cycle the pressure falls below level B and stays above level A. Consequently, the offset value is not changed. In the fourth pressure cycle the pressure does not fall below both level B and level A. Consequently, the offset value is increased and X ms after detection of the first event a drop in the output signal can be seen.

Several embodiments of the invention have been described above by way of exemplary embodiments. Various modifications and variations for the elements described with respect of these embodiments may be made by the skilled person without departing from the scope of the present invention, which is defined by the appended claims. For example, the detection of the first event could be the detection of the top of the peak and the corresponding instant or any other characteristic of the signal with a predictable instant in a cycle. Furthermore, the invention could also be applied for only sensitivity compensation.

The invention claimed is:

1. Method of compensation for a cyclical output signal, the method comprises
    detecting a first event in the cyclical output signal wherein a falling or rising edge passing a predetermined level in the output signal triggers the detection;
    generating a compensation signal;
    combining the compensation signal and a cyclical input signal from a sensor to obtain the cyclical output signal wherein the compensation signal is adjusted a delay time period after the detection of the first event.

2. Method of compensation according to claim 1 further comprises determining a period of time between subsequent detections of events, wherein the delay time period has a relationship with said period of time.

3. Method of compensation according to claim 1, wherein the compensation signal is generated in response to the detection of the first event and the detection of a second event in the cyclical output signal in the period after the detection of the first event and the subsequent detection of the first event.

4. Method of compensation according to claim 1, wherein the compensation signal is generated in response to the detection of the first event and the detection of a second event and a third event in the cyclical output signal in the period after the detection of the first event and the subsequent detection of the first event.

5. Method of compensation according to claim 3 or 4 wherein the second event is detected when the cyclical output signal is below a further predefined output value.

6. Method of compensation according to claim 1, wherein the compensation signal is generated in response to the detection of the first event and another input signal.

7. Method of compensation according to claim 1, wherein the cyclical input signal is retrieved from a cylinder pressure.

8. Method of compensation according to claim 1, wherein the compensation signal is controlled with a digital signal.

* * * * *